No. 641,061. Patented Jan. 9, 1900.
C. H. WOODRUFF
FOLDING SEAT.
(Application filed June 5, 1899.)
(No Model.)
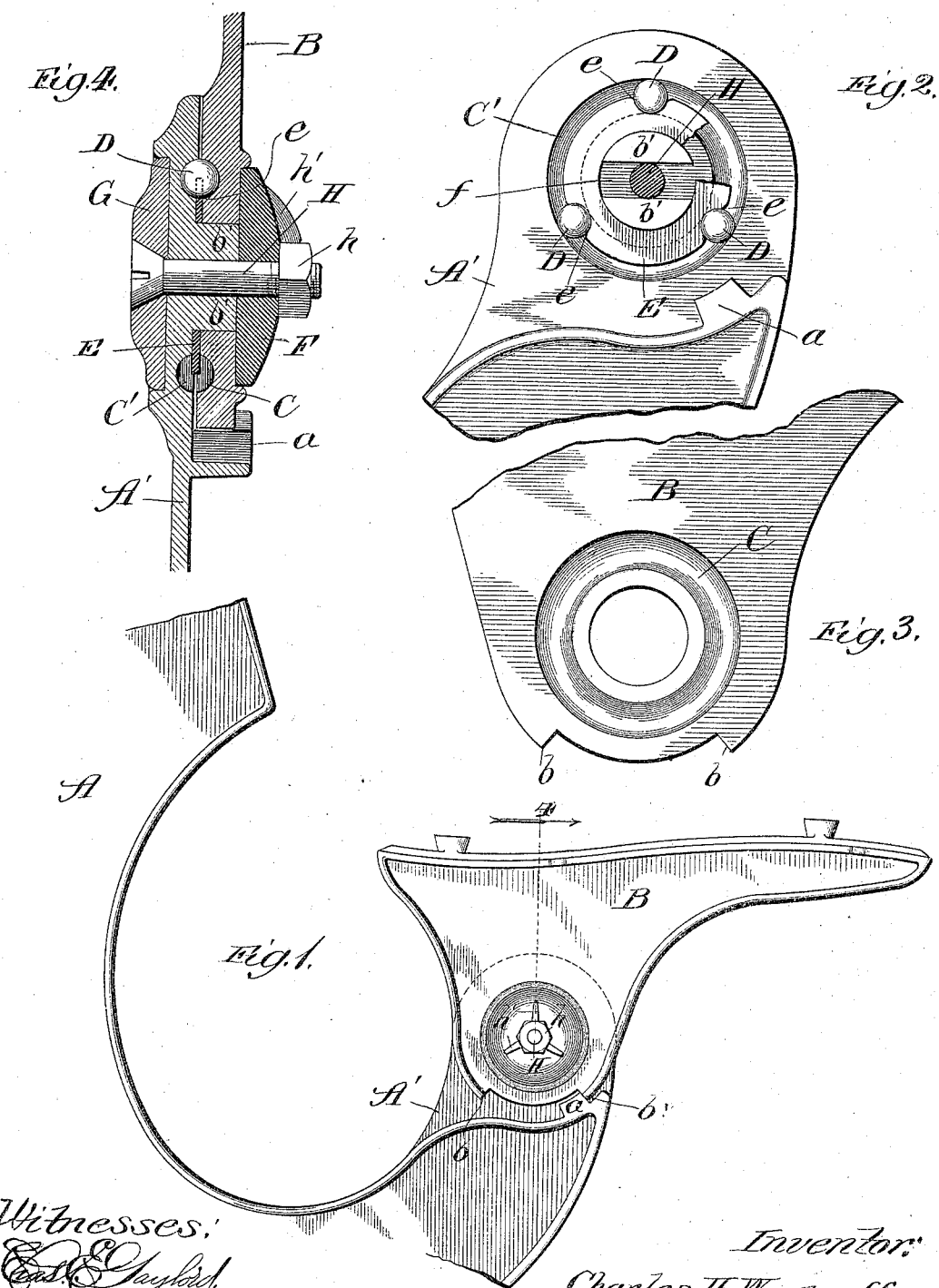

UNITED STATES PATENT OFFICE.

CHARLES H. WOODRUFF, OF ELGIN, ILLINOIS.

FOLDING SEAT.

SPECIFICATION forming part of Letters Patent No. 641,061, dated January 9, 1900.

Application filed June 5, 1899. Serial No. 719,464. (No model.)

*To all whom it may concern:*

Be it known that I, CHARLES H. WOODRUFF, a citizen of the United States, residing at Elgin, Kane county, Illinois, have invented a new and useful Improvement in Folding Seats, of which the following is a specification.

The object of my invention is to provide the seat-arm of a desk, opera-chair, or similar furniture with a suitable ball-bearing to enable it to be easily and readily folded; and the invention consists in the features and combinations hereinafter described and claimed.

In the accompanying drawings, Figure 1 is a broken elevation of a portion of a desk leg or standard equipped with my improvement; Fig. 2, a longitudinal broken elevation of a portion of the standard; Fig. 3, a broken elevation of the seat-arm, and Fig. 4 an enlarged sectional elevation taken on line 4 of Fig. 1.

Although my invention is applicable to desks, opera-chairs, and folding seats generally, I have shown it in the drawings as applied to the leg or standard of an ordinary desk, and for convenience I will so describe it. It will be understood, however, that I do not intend to limit myself to a desk leg or standard or any other particular structure.

As shown in the drawings, A is the ordinary standard or leg of a desk, having an extension A', to which is pivoted a seat arm or support B. The extension A' is provided with a stop $a$, which is engaged by stops $b$ on the seat-arm, limiting the movements of the arm in raising and lowering. The seat-arm, at its head or attaching end, is provided with a groove C, and the extension A' has a corresponding groove C' therein, which grooves form a channel for the reception of the balls D of the ball-bearing. Around the hub $b'$ of the arm B is a washer E, having in its periphery or edge a plurality of recesses or notches $e$, each receiving a ball. I prefer to have three of these recesses or notches in the washer, so as to use three balls in forming the ball-bearing; but any number of notches and balls may be used, as desired.

When the parts are assembled in use, the arm is secured to the standard by means of a washer F, having lugs on its inner face adapted to enter notches $f$ in the hub of the arm, and the standard has a recess receiving a washer G, so that by means of these washers and the clamping-bolt H the arm can be drawn to place on the standard, so as to form the channel for the balls and pivotally secure the arm to permit the folding thereof. The washer E, through its recesses or notches $e$, holds the balls in fixed position with reference to each other and so that they cannot have any independent movement—that is, any movement except with the washer itself. While thus holding the balls in the same relative relation to each other, this arrangement leaves them free to roll with the turning of the arm, and thus permits a free movement without any great amount of friction. The retaining of the balls in a positive relation to each other through the medium of the washer furnishes a bearing for the operation of the seat which is free from the objection of having the balls come in contact and by which the seat-arm is at all times free to turn on its pivot with but little friction.

The parts are easily assembled for use by placing the washer in position around the hub of the seat-arm and inserting the balls in the notches or recesses in the washer, then placing the arm, with the washer and balls, on the standard, applying the washer F for the lugs thereof to enter the recesses $f$, placing the washer G in position, and inserting the clamping-bolt through the washers, standard, and arm and securing it in place by its nut. The form of clamping-bolt shown is the one having a notch in its head for a screw-driver or other tool, so that the bolt can be screwed from its head end into the nut $h$ for the nut to be held between projections $h'$ on the washer F when the parts are together; but other forms of clamping or securing devices may be used, as desired.

I claim—

1. In a folding seat, the combination of a standard or support and a seat-arm, each having an annular groove, an interposed washer having notches in its periphery, balls carried by the notches, and means for holding the parts together, substantially as described.

2. In a folding seat, the combination of a standard or support and a seat-arm, each having an annular groove in its face, an interposed washer having in its periphery recesses or notches, balls carried by the notches or recesses of the washer, and a clamping-bolt, substantially as described.

3. In a folding seat, the combination of a standard or support and a seat-arm, each having an annular groove in its face, an interposed washer provided with recesses or notches in its periphery, a series of balls carried by the washer, a locking-washer engaging the hub of the seat-arm, and a pivotal clamping-bolt having a nut held by the locking-washer when the parts are together, substantially as described.

CHAS. H. WOODRUFF.

Witnesses:
EPHRAIM BANNING,
THOMAS B. McGREGOR.